A-A

INVENTORS
Herbert Krautwald
Harry Schroeder
Werner Bosch

United States Patent Office
3,505,629
Patented Apr. 7, 1970

3,505,629
UNIPOLAR FLAT-TYPE OF MINIATURE CONSTRUCTION
Herbert Krautwald, Harry Schroeder, and Werner Bosch, Munich, Germany, assignors to Siemens Aktiengesellschaft, a coporation of Germany
Filed Aug. 16, 1967, Ser. No. 660,944
Claims priority, application Germany, Aug. 18, 1966, S 105,423
Int. Cl. H01f 7/08
U.S. Cl. 335—275        2 Claims

ABSTRACT OF THE DISCLOSURE

A unipolar flat-type relay of miniature construction having an E-shaped yoke, a spool carrying a field winding disposed on the center yoke leg, a flat U-shaped armature pivotally disposed on the yoke, and the a frame-like leaf bearing spring which is attached at one end to the outer yoke legs, for example by rivets, the opposite free end of the bearing spring carrying the armature, such bearing spring having a bend therein with the bearing force and the armature reset force being adjustable by selection of the bias angle of the bearing spring, formed by said bend, said spool having an extension thereon forming a stop for the bearing spring and armature which determines the reset position thereof, and in which the pivotal axis may be determined by means projecting the yoke, the spring may be so constructed that a grounding plug is provided, and the spool may be so constructed that a definite predetermined positioning of the spool on the center yoke leg may be achieved.

THE DISCLOSURE

The invention relates to an unipolar flat-type relay of miniature construction utilizing an E-shaped yoke with a field winding disposed on the center leg and an armature pivotally positioned on the yoke.

It is known that relays which are to be used in flat-type group technology must have an extremely low overall height in order to be able to maintain as small a distance between units as possible. Furthermore, it is required particularly for connection to etched printed circuit boards, that the base of the relay be as small as possible. Since such type of relays are produced in great quantities, it is furthermore very important that they comprise only a few simple structural members which do not require specific adjustment following installation.

The demands made on a relay of the type described are fulfilled by utilizing a frame-like leaf-shaped bearing spring connected, for example, by rivets to the outer legs of an E-shaped yoke, while the free end of the bearing spring carries, by means of rivets or the like, a flat U-shaped pivoted armature, and in which the bearing force and armature reset force, respectively, are adjustable through the selection of the bias angle of the bearing spring, with the positioning of the bearing spring, together with the armature, being determined by an extension on the spool for the energizing winding. The arrangement according to the invention has, in addition to the advantage of only a few structural members, so that a simple installation is possible, the advantage that the mounting of the armature on the leaf spring, constructed in the form of a rectangular frame, provides both a reset force and a bearing load at the bearing point. Thus, a stable position of the armature is determined by an extension of the spool, whose dimensions necessarily have small tolerances.

In a further advantageous development of the invention, in order to obtain a definite pivoted axis for the armature on the outer legs of the yoke, there are provided preferably tapering or conically formed projections, against which the end of the armature bears under the bearing forces applied by the opening and thus serves as the pivotal center therefor. A relatively friction-free armature bearing is thereby created, in which the armature abuts the projections and thus creates practically no friction at the bearing axis.

The extension of the spool, employed as an armature stop, can be of low tolerance, only if the spool itself can be placed in a definite predetermined position at installation. A preferred embodiment of the invention therefore provides that the upper side of the center yoke leg is necessarily form-fitting with the top wall of the aperture in the spool. For this purpose, there is provided a rib-like elevation which forces the upper side of the center leg of the yoke in close contact with the upper wall of the aperture.

In a further development of the invention, the extension of the armature spring is formed as a connection plug originating from the attachment point established by rivets, which plug serves as grounding connection. Thus, with this form of construction no additional separate part is required for the ground connection.

Further details of the invention are readily apparent from the following description of an illustrative embodiment presented in the drawings, in which.

Figure 1:
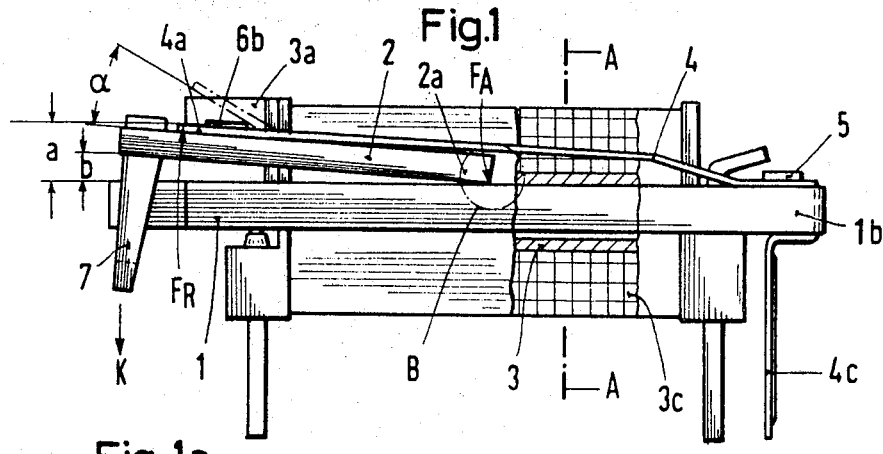
FIG. 1 is a side elevation of a relay embodying the invention, with a portion thereof broken away to show details thereof.

The flat-type relay diagrammatically illustrated in FIG. 1 employs an E-shaped yoke for the drive system having a center leg 1a and outer legs 1b. On center leg 1a there is disposed a spool 3 which carries a field winding 3c. Cooperable with the E-shaped yoke is a flat U-shaped armature 2 which is carried by a frame-like leaf bearing spring 4, to which the armature 2 is connected by suitable means such as rivets 6. The bearing spring itself, in turn, is attached to the outer yoke legs 1b by suitable means such as rivets 5 (see FIG. 2). The attachment of the bearing spring and yoke as well as the armature can, of course, also be effected by welding.

Figure 1A:
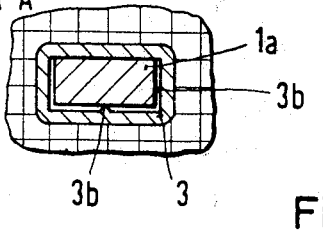
FIG. 1a is a section taken approximately on the line A—A of FIG. 1.

Prior to installation, the bearing spring 4 is given a bias at angle α which, after assembly, results in the creation of the necessary bearing force $F_A$ and the contact rest force $F_R$. Thus, adequate resistance to shock and vibrations is also provided. Likewise, armature stroke b need not be adjusted after the parts have been assembled, since limiting dimension a is of low tolerance. Such limiting dimension is determined by the extension 3a of spool 3. It need be assumed only that after pushing spool 3 with its winding 3c onto center yoke leg 1a, the spool comes in a definite predetermined position. This definte position is achieved by disposing a rib-like elevation 3b" in the bore 3b of spool 3, which forces the upper face of center yoke leg 1a into close contact with the upper wall of bore 3b. This particular detail is illustrated in FIG. 1a.

Figure 1B:
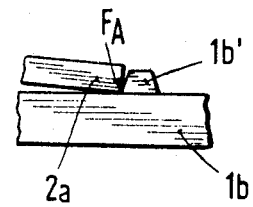
FIG. 1b is an enlarged view of the circled portion of FIG. 1, designated by the letter B.

FIG. 1b illustrates another detail of FIG. 1 is shown which, as mentioned, is identified by the letter B. It is apparent from this figure that the end 2a of armature 2 is provided projections 1b of tapered or conical formation which are struck out of the yoke legs 1b. Thus, there is established a definite pivotal axis for the armature, with the armature end 2a being urged by the bearing force $F_A$ into operating position. This embodiment has particular importance where the operational cycles run into extensively high numbers because the increased importance of reducing friction in such case. Plunger 7, which can be seen in FIG. 1, is provided at the free end of armature 2 and serves, under norma service conditions, to actuate a suitable contact arrangement (not illustrated) of the relay. The direction of actuation and the direction of the occurring actuation force, respectively, for the contact arrangement are designated by an arrow identified by the letter K. Moreover, as apparent from FIG. 1 the armature spring 4 extends perpendicularly in downward direction from its attachment point, established by rivets 5, embracing the yoke with its end 4c formed as a plug contact for ground connection, as a result of which no special separate structural member is required therefor.

Figure 2:
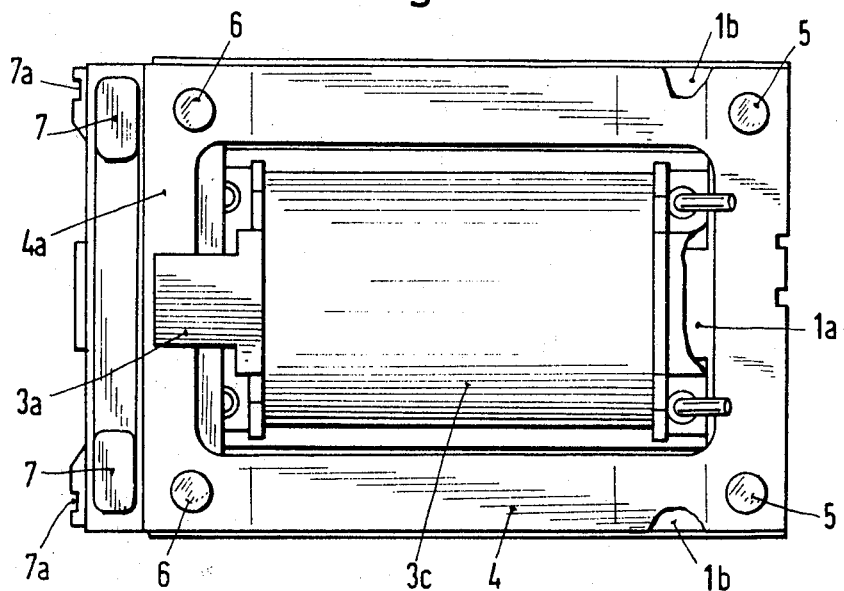
FIG. 2 is a top plan view of the structure of FIG. 1.

FIG. 2 illustrates the frame-like leaf bearing spring 4, and its attachment to the two outer yoke legs by means of rivets 5. On the other hand, rivets 6 seem to retain armature 2 in operative position below the bearing spring 4. It will also be apparent from this figure how the extended spool 3a is employed as the upper stop for the armature 2 and the armature spring 4, respectively. Furthermore, it will be noted that the plunger 7 is provided with a recess 7a in which the contact spring of the (not illustrated) contact arrangement is to be engaged.

Changes may be made within the scope and spirit of the appended claims which define what is believed to be new and desired to have protected by Letters Patent.

We claim:
1. A unipolar flat-type relay of miniature construction comprising an E-shaped yoke,
    a spool carrying a field winding disposed on the center leg of said yoke,
    a flat U-shaped armature having its free ends pivotally disposed at one end on outer legs of said yoke,
    a frame-like leaf bearing spring attached at one end to outer legs of said yoke and to the armature at the opposite end,
    said bearing spring having a portion bent away from said armature at a bias angle to provide desired armature bearing force and armature reset force,
    said spring providing the sole bearing force for the armature, said spool having an extension thereon forming a support surface for said bearing spring and armature to determine the reset position of the armature,
    said outer legs of said yoke being provided with projections, intermediate said ends of said spring, abutting the free ends of the armature, said free ends bearing against and pivoting at the locus of contact with said projections under bearing forces applied by said spring.

2. A unipolar relay according to claim 1, wherein said spool is provided with a bore therein through which said center yoke leg extends, said bore having an upper wall constructed to closely engage an adjacent face of said yoke leg and spaced from said supporting surface a certain distance, thereby enabling the rest position of said armature to be positively established with respect to said yoke.

References Cited

UNITED STATES PATENTS

| | | | |
|---|---|---|---|
| 3,403,364 | 9/1968 | Turner | 335—273 |
| 2,397,635 | 4/1946 | Wood | 335—135 XR |
| 3,345,592 | 10/1967 | Kuke | 335—135 |
| 3,277,409 | 10/1966 | Faffart | 335—128 |
| 2,693,554 | 11/1954 | Vigren et al. | 335—276 |
| 2,169,740 | 8/1939 | Peek | 335—274 |

FOREIGN PATENTS 914,690  10/1946  France.

OTHER REFERENCES

Das 1,113,753, September 1961, Germany, Arnstadt.

GEORGE HARRIS, Primary Examiner

D. M. MORGAN, Assistant Examiner

U.S. Cl. X.R.
335—276, 279